US010099604B2

(12) United States Patent
Matsuno

(10) Patent No.: US 10,099,604 B2
(45) Date of Patent: Oct. 16, 2018

(54) HEADLIGHT DEVICE

(71) Applicant: Stanley Electric Co., Ltd., Tokyo (JP)

(72) Inventor: Kiichi Matsuno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/408,102

(22) Filed: Jan. 17, 2017

(65) Prior Publication Data

US 2017/0210278 A1 Jul. 27, 2017

(30) Foreign Application Priority Data

Jan. 25, 2016 (JP) .................................. 2016-011447

(51) Int. Cl.
*B60Q 1/12* (2006.01)
*F21S 41/675* (2018.01)

(52) U.S. Cl.
CPC ............ *B60Q 1/122* (2013.01); *F21S 41/675* (2018.01); *B60Q 2300/112* (2013.01); *B60Q 2300/122* (2013.01); *B60Q 2300/13* (2013.01); *B60Q 2300/314* (2013.01); *B60Q 2300/41* (2013.01)

(58) Field of Classification Search
CPC .................................. B60Q 1/122; B60Q 1/08
See application file for complete search history.

(56) References Cited

U.S. PATENT DOCUMENTS 5,579,148 A * 11/1996 Nishikawa ........... G02B 26/101
                                                        235/462.36
7,009,748 B2 * 3/2006 Turner ................. G02B 7/1821
                                                        347/260
7,446,911 B2 * 11/2008 Asai .................... G02B 26/0833
                                                        358/474

(Continued)

FOREIGN PATENT DOCUMENTS

EP    2 581 648 A1    4/2013
FR    3 010 486 A1    3/2015

(Continued)

OTHER PUBLICATIONS

Anonymous; "Microscanner"; Wikipedia; Nov. 6, 2015; XP055376253.
The extended European search report for the related European Patent Application No. 17151993.7 dated Jun. 22, 2017.

*Primary Examiner* — William N Harris
(74) *Attorney, Agent, or Firm* — Kenealy Vaidya LLP

(57) ABSTRACT

A headlight device provided enables horizontally displacing of the irradiation region for scanning of scanning light by a light deflector without problems. The light deflector includes: a mirror unit that reciprocally turns about first and second rotation axes at first and second frequencies. The first frequency is a natural-oscillation frequency of the mirror unit, and the second frequency is lower than the first frequency. Directions of the first and second rotation axes are set so that scanning directions of the reflect light due to the reciprocal turning of the mirror unit about the first and second rotation axes are in the directions of vertical axis and horizontal axis, respectively. The control unit controls recip- (Continued)

rocal turning of the mirror unit about the second rotation axis based on driving voltage obtained by superimposing offset voltage with basic driving voltage having an increasing and decreasing waveform.

6 Claims, 12 Drawing Sheets

(56) References Cited

U.S. PATENT DOCUMENTS

| | | |
|---|---|---|
| 2010/0245966 A1* | 9/2010 | Yasuda .............. G02B 26/0858 |
| | | 359/224.1 |
| 2013/0094235 A1* | 4/2013 | Sugiyama ........... F21S 48/1388 |
| | | 362/514 |
| 2015/0176805 A1 | 6/2015 | Schwaiger et al. |

FOREIGN PATENT DOCUMENTS

| | | |
|---|---|---|
| JP | 5577138 B2 | 8/2014 |
| JP | 2015-230768 A | 12/2015 |
| WO | 2015/122482 A1 | 8/2015 |

* cited by examiner

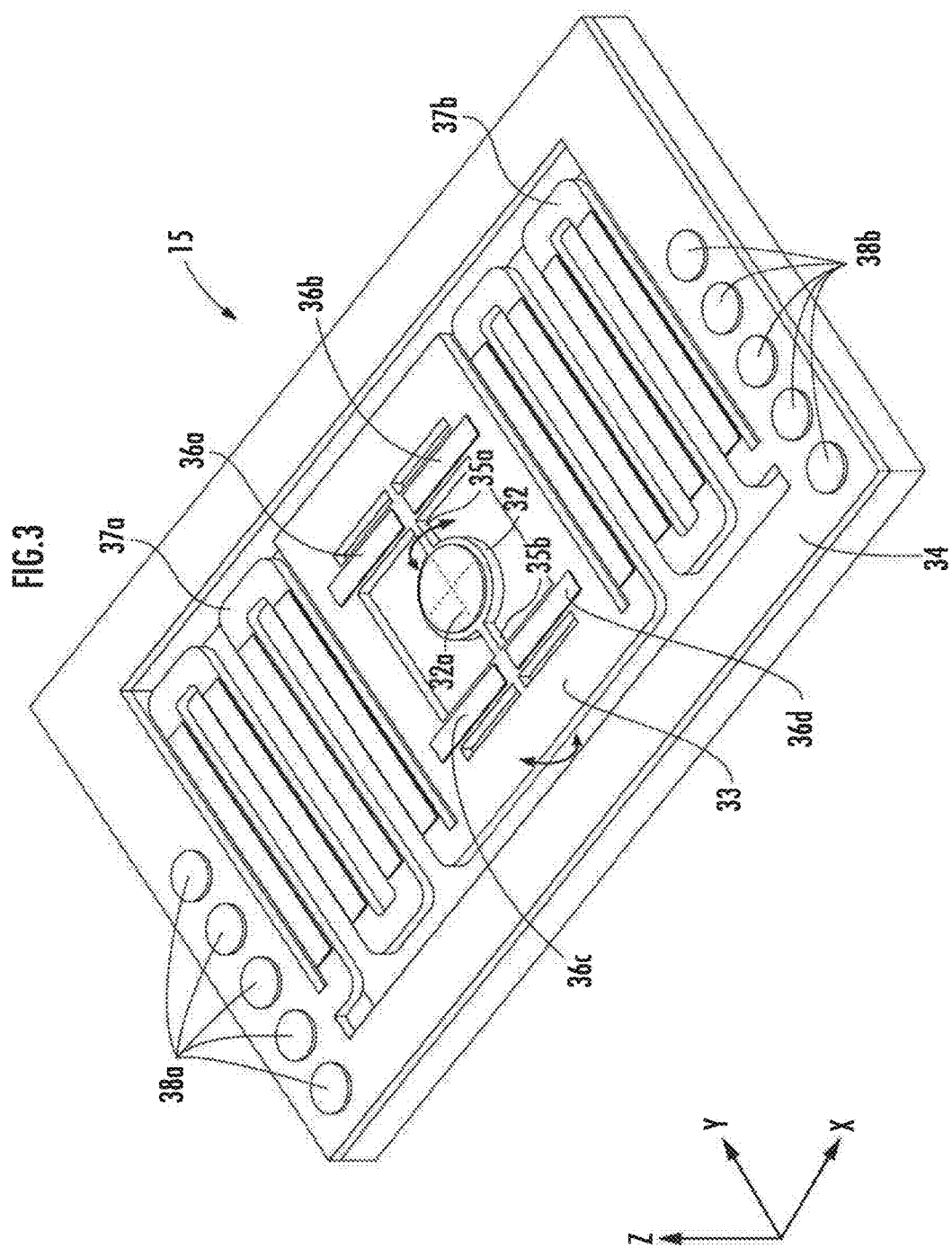

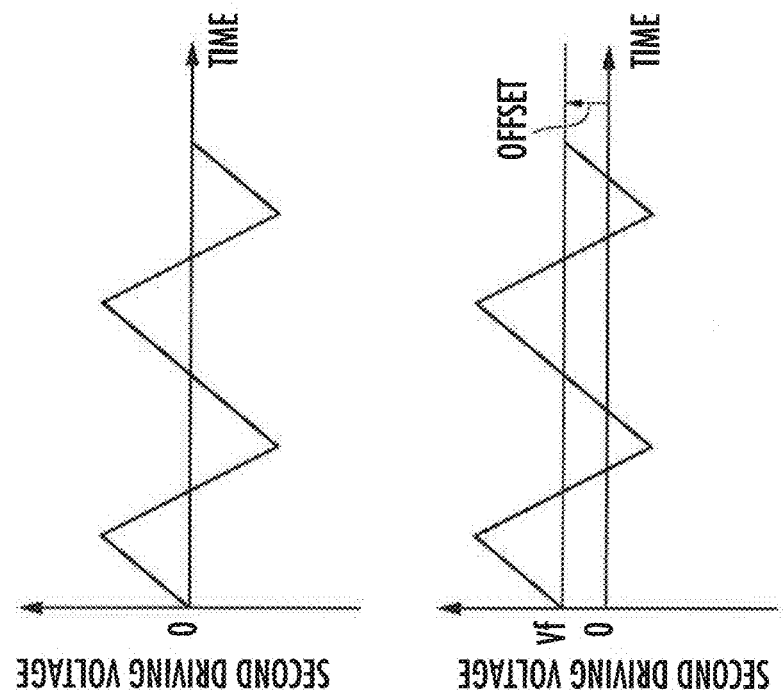
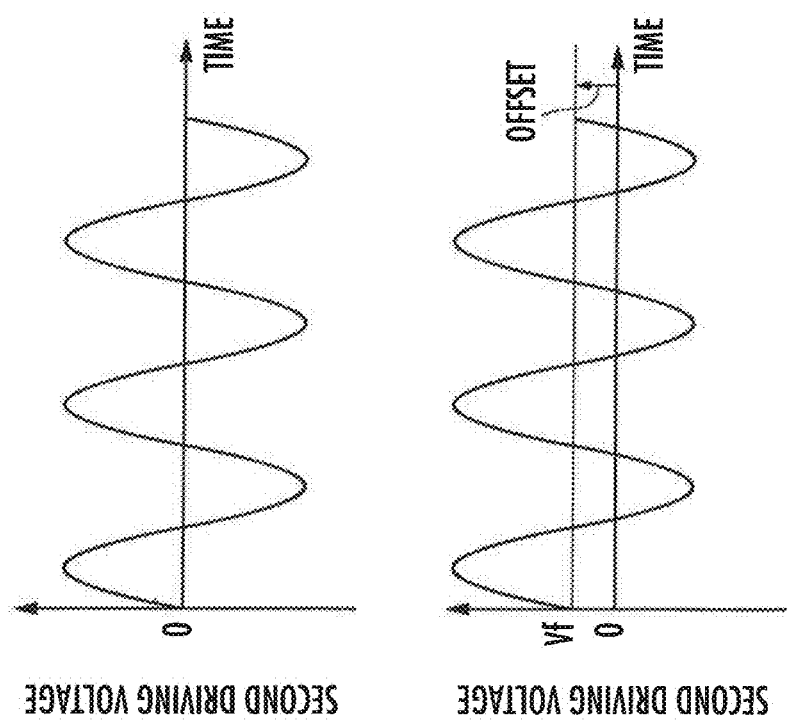

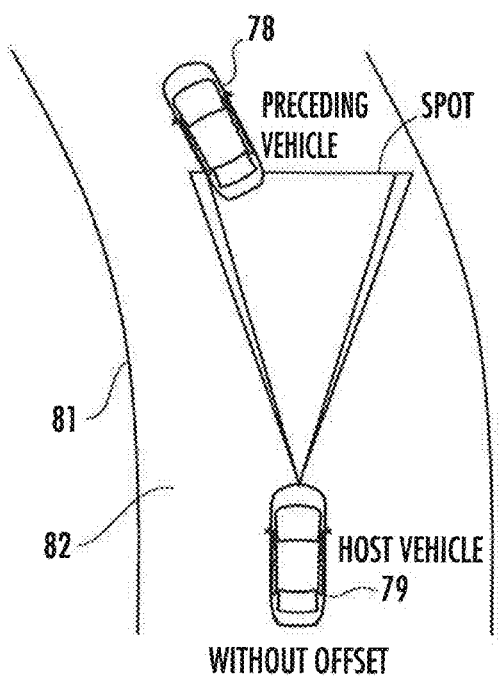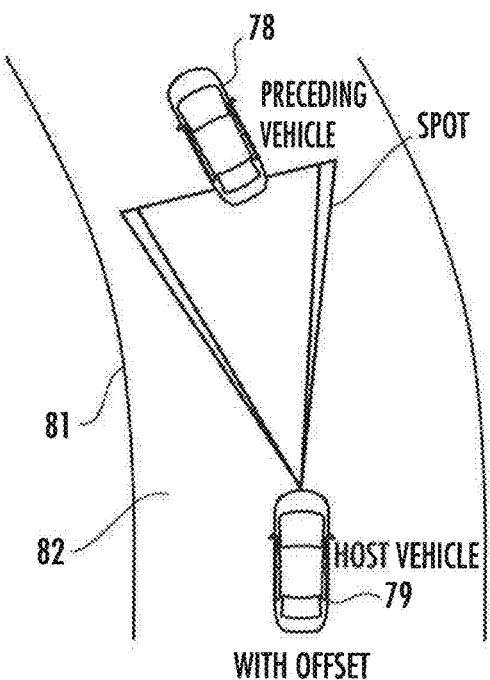

HEADLIGHT DEVICE

BACKGROUND OF THE INVENTION

Field of the Invention

The present invention relates to headlight devices.

Description of the Related Art

Headlights for vehicles have been known, which include a light deflector of a

MEMS (Micro Electro Mechanical Systems) and are configured to irradiate a region to be irradiated with reflected light from a mirror unit of the light deflector (e.g., JP 5577138 B).

A light deflector of a MEMS to be mounted on a headlight for vehicles typically includes a mirror unit that can reciprocally turn about first and second rotation axes that are orthogonal to each other, and an actuator configured to turn the mirror unit about the first and second rotation axes.

Let that the reciprocal turning of the mirror unit about the first and second rotation axes have a first frequency and a second frequency, respectively, one of these frequencies is set higher than the other, and the one frequency is set at the frequency of the natural oscillation of the mirror unit (resonant frequency) so as to allow the mirror unit to reciprocally turn stably at the high frequency.

In a conventional headlight device including a light deflector, the position of the region where emitted light scans is fixed relative to the vehicle. Therefore, when the vehicle travels along a curved road, for example, the irradiation region may be outside of the road, or a specific target may be outside of the irradiation region.

When the scanning region (irradiation region) of the scanning light is displaced horizontally, the direction of the light deflector as a whole is changed. To this end, the light deflector as a whole has to be turned by the actuator, which means a complicated structure of the light deflector. When the mirror unit is reciprocally turned at its resonant frequency, it is substantially difficult to adjust the center turning angle in the range of the reciprocal turning.

SUMMARY OF THE INVENTION

The present invention aims to provide a headlight device configured to scan reflected light from a mirror unit of a light deflector by reciprocally turning the mirror unit about a rotation axis, and capable of displacing the irradiation region horizontally without problems.

A headlight device according to a first aspect of the present invention includes a light source, a light deflector, and a control unit. The light deflector includes: a mirror unit configured to reflect light from the light source in a direction corresponding to a turning angle of the mirror unit about a first rotation axis and a second rotation axis, the first rotation axis and the second rotation axis being orthogonal to each other; a first actuator configured to reciprocally turn the mirror unit about the first rotation axis in accordance with a first driving voltage; and a second actuator configured to reciprocally turn the mirror unit about the second rotation axis in accordance with a second driving voltage. The control unit includes: a resonant control unit configured to generate the first driving voltage based on sinusoidal voltage at a first frequency that is a resonant frequency of natural oscillation of the mirror unit about the first rotation axis, and outputs the first driving voltage to the first actuator; and a non-resonant control unit configured to generate the second driving voltage based on superimposed voltage obtained by superimposing offset voltage with basic driving voltage having an increasing and decreasing waveform at a second frequency, the second frequency being a non-resonant frequency lower than the first frequency, and outputs the second driving voltage to the second actuator. Directions of the first and second rotation axes of the light deflector relative to an optical axis of incident light to the mirror unit are set so that reflected light from the mirror unit due to reciprocal turning of the mirror unit about the first rotation axis is scanned vertically in an irradiation region in front and reflected light from the mirror unit due to reciprocal turning of the mirror unit about the second rotation axis is scanned horizontally in the irradiation region in front.

According to the first aspect of the present invention, directions of the first and second rotation axes are set so that reflected light from the mirror unit due to reciprocal turning of the mirror unit about the first and second rotation axes are scanned vertically and horizontally, respectively, in an irradiation region in front. The second driving voltage is given to turn the mirror unit reciprocally about the second rotation axis at the second frequency that is a non-resonant frequency, and the second driving voltage includes offset voltage. Thereby, the irradiation region can be displaced horizontally without problems by adjusting the offset voltage of the second driving voltage.

Preferably, the headlight device according to the first aspect of the present invention further includes a situation detection unit configured to detect situation on driving of a vehicle, and the non-resonant control unit determines the offset voltage in accordance with situation detected by the situation detection unit.

With this configuration, the irradiation region can be displaced horizontally correctly in accordance with the situation on driving of the vehicle.

Preferably, in the headlight device according to the first aspect of the present invention, the second driving voltage is voltage having a sawtooth form.

This configuration enables smooth reciprocal turning of the mirror unit about the second rotation axis.

A headlight device of a second aspect of the present invention includes first and second irradiation systems, and a control unit configured to control the first and second irradiation systems. The irradiation systems individually include a light source and a light deflector configured to deflect light from the light source, and include a projector unit common to the irradiation systems to project light from the light deflectors to an irradiation region in front. The light deflector of each irradiation system includes: a mirror unit configured to reflect light from the light source in a direction corresponding to a turning angle of the mirror unit about a first rotation axis and a second rotation axis, the first rotation axis and the second rotation axis being orthogonal to each other; a first actuator configured to reciprocally turn the mirror unit about the first rotation axis in accordance with a first driving voltage; and a second actuator configured to reciprocally turn the mirror unit about the second rotation axis in accordance with a second driving voltage. The control unit includes, for the light deflectors of the irradiation systems: a resonant control unit configured to generate the first driving voltage based on sinusoidal voltage at a first frequency that is a resonant frequency of natural oscillation of the mirror unit about the first rotation axis, and outputs the first driving voltage to the first actuator; and a non-resonant control unit configured to generate the second driving voltage based on basic driving voltage having an increasing and decreasing waveform at a second frequency, the second frequency being a non-resonant frequency lower than the first frequency, and outputs the second driving voltage to the second actuator. In the first irradiation system, directions of the first and second rotation axes of the light deflector relative to an optical axis of incident light to the mirror unit are set so that reflected light from the mirror unit due to reciprocal turning of the mirror unit about the first rotation axis is scanned horizontally in an irradiation region in front and reflected light from the mirror unit due to reciprocal turning of the mirror unit about the second rotation axis is scanned vertically in the irradiation region in front. In the second irradiation system, directions of the first and second rotation axes of the light deflector relative to an optical axis of incident light to the mirror unit are set so that reflected light from the mirror unit due to reciprocal turning of the mirror unit about the first rotation axis is scanned vertically in an irradiation region in front and reflected light from the mirror unit due to reciprocal turning of the mirror unit about the second rotation axis is scanned horizontally in the irradiation region in front. The non-resonant control unit generates, for the second actuator of the second irradiation system, the second driving voltage based on superimposed voltage obtained by superimposing offset voltage with the basic driving voltage.

According to this headlight device of the second aspect of the present invention, two irradiation regions are generated by the first and second irradiation systems. This allows sharing by the first and the second irradiation regions, and ensures a constant irradiation region by the first irradiation system. As a result, even when the irradiation region generated by the second irradiation system is displaced, the irradiation region as a whole can be kept favorably.

Preferably in this headlight device of the second aspect of the present invention, the irradiation region includes a first irradiation region and a second irradiation region, the first irradiation region being irradiated with light from the first irradiation system, and the second irradiation region being irradiated with light from the second irradiation system, and the non-resonant control unit generates the second driving voltage so that the second irradiation region is displaced horizontally within the first irradiation region.

This configuration allows the second irradiation region to be displaced horizontally within the first irradiation region, and therefore the second irradiation region is irradiated with superimposed light from the first and the second irradiation systems.

Preferably, this headlight device of the second aspect of the present invention further includes: a situation detection unit configured to detect situation on driving of a vehicle, and the non-resonant control unit determines the offset voltage in accordance with situation detected by the situation detection unit.

With this configuration, the irradiation region by the second irradiation system can be displaced horizontally correctly in accordance with the situation on driving of the vehicle.

This configuration enables smooth reciprocal turning of the mirror unit about the second rotation axis.

Preferably, in this headlight device of the second aspect of the present invention, the second driving voltage is voltage having a sawtooth form.

This configuration enables smooth reciprocal turning of the mirror unit about the second rotation axis.

BRIEF DESCRIPTION OF THE DRAWINGS

FIG. 3 is a perspective view of a light deflector viewed from diagonally forward.

FIG. 9A and FIG. 9B show other examples of the waveform of the second driving voltage, and shows a comparison between with offset and without offset.

FIG. 11A shows SPOT irradiation region generated by a vehicle not including the headlight device of FIG. 10 when the vehicle travels along a curved road.

FIG. 11B shows SPOT irradiation region generated by a vehicle including the headlight device of FIG. 10 when the vehicle travels along a curved road.

DESCRIPTION OF THE PREFERRED EMBODIMENTS

Figure 1:
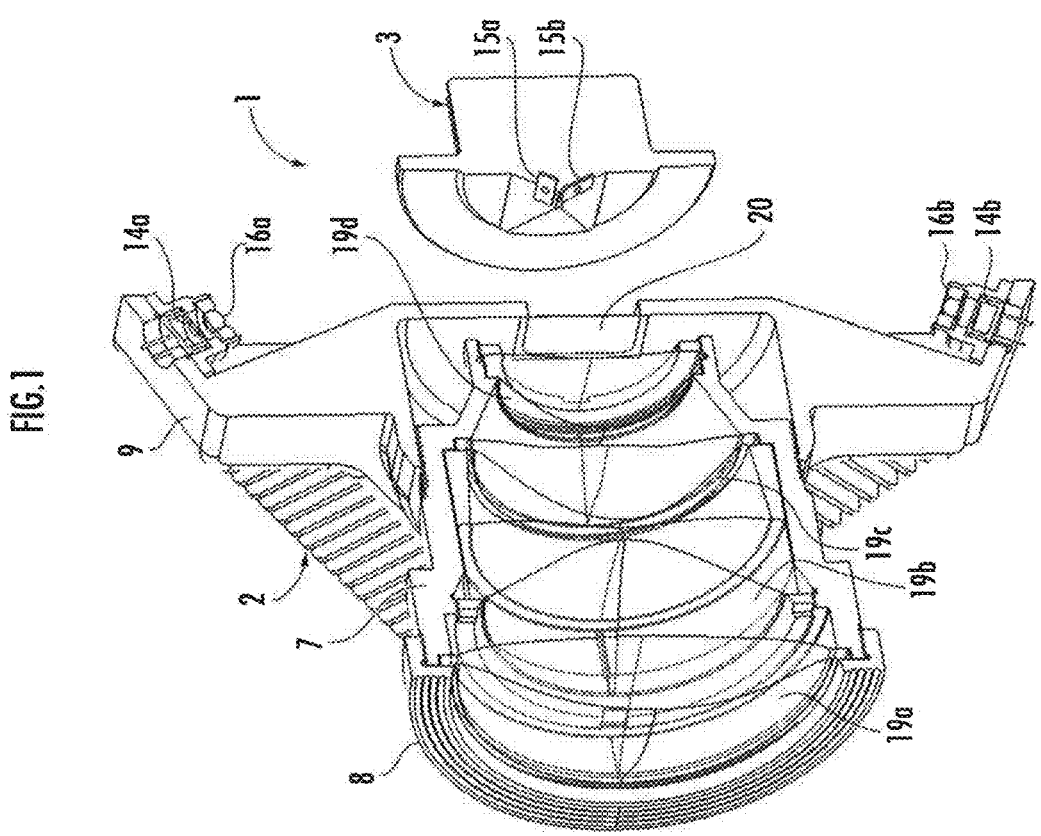
FIG. 1 is a perspective view of a half part of a headlight unit when the headlight unit is divided into halves at the symmetry plane.
Figure 2:
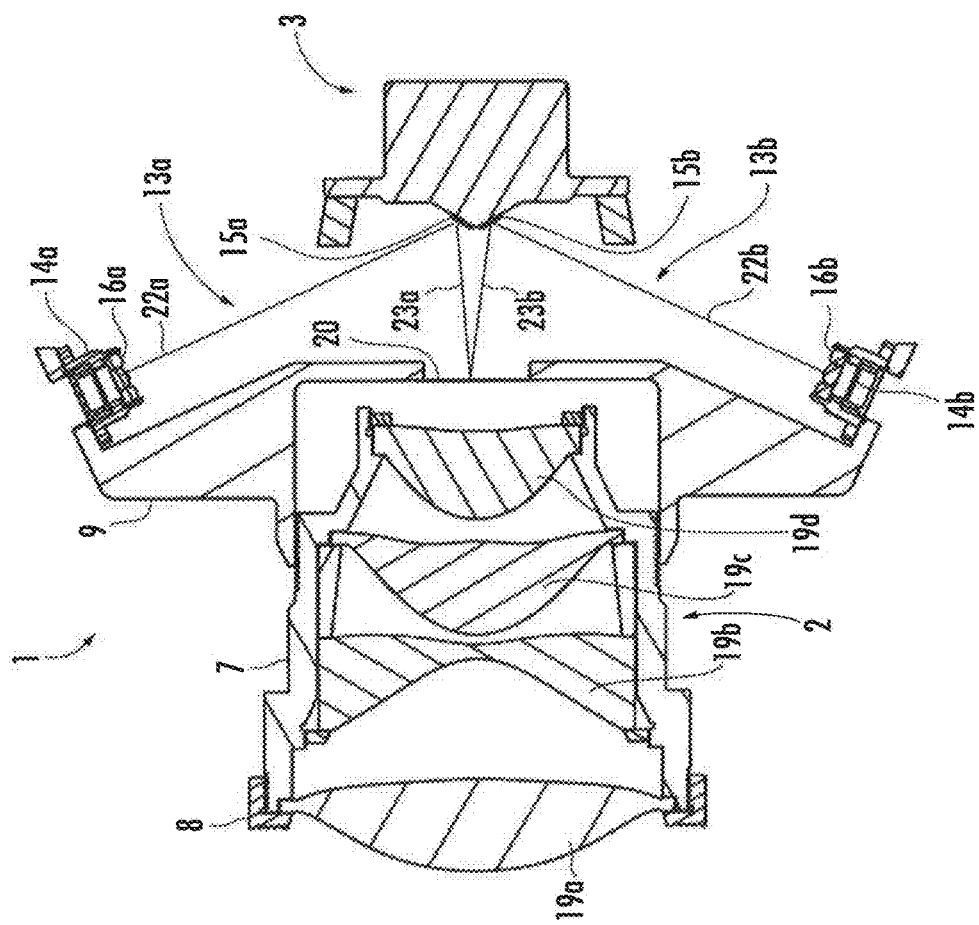
FIG. 2 is a cross sectional view of the headlight unit taken along the symmetry plane.

FIG. 1 is a perspective view of a half part of a headlight unit 1 when the headlight unit 1 is divided into halves at the symmetry plane. FIG. 2 is a cross sectional view of the headlight unit 1 taken along the symmetry plane.

Two of the headlight units 1 are disposed at each of the headlights on the left and right of a vehicle. That is, the vehicle as a whole has four of the headlight units 1. Each headlight unit 1 includes a first irradiation system 13a and a second irradiation system 13b as described later. That is, the vehicle as a whole has four irradiation systems on the left and the right, and has eight irradiation systems in total. Each irradiation system can have its own irradiation region.

In FIGS. 1 and 2, the headlight unit 1 includes a front assembly 2 and a rear assembly 3. The front assembly 2 is attached to a front end of a unit attachment hole that is formed at a front part of the vehicle not illustrated where a headlight is to be disposed. The rear assembly 3 is attached at the back of the unit attachment hole. The front assembly 2 and the rear assembly 3 are disposed so that their center lines are aligned with the center line of the unit attachment hole.

The front assembly 2 includes a lens holder 7, an annular cap 8 and a laser holder 9. The annular cap 8 is assembled to the lens holder 7 so that its inner peripheral part is screwed with the outer peripheral part at the front end of the lens holder 7. The laser holder 9 is assembled to the lens holder 7 so that its inner peripheral at the front end is screwed with the outer peripheral at the rear end of the lens holder 7.

The headlight unit 1 includes the first irradiation system 13a and the second irradiation system 13b, each enabling setting of its own irradiation region in front of the vehicle. The first irradiation system 13a and the second irradiation system 13b are positioned up and down in their positional relationship. The first irradiation system 13a includes a laser-light emission device 14a, a condenser lens 16a, and a light deflector 15a. The laser-light emission device 14a is fixed at an upper part of the inner periphery at the rear end of the laser holder 9. The condenser lens 16a is attached at the emitting unit of the laser-light emission device 14a. The light deflector 15a is fixed at the upper inclined face near the center of the front face of the rear assembly 3. The second irradiation system 13b includes a laser-light emission device 14b, a condenser lens 16b, and a light deflector 15b. The laser-light emission device 14b is fixed at a lower part of the inner periphery at the rear end of the laser holder 9. The condenser lens 16b is attached at the emitting unit of the laser-light emission device 14b. The light deflector 15b is fixed at the lower inclined face near the center of the front face of the rear assembly 3.

On the inner periphery of the lens holder 7, projector lenses 19a to 19d are disposed in sequence from the front along a line in the front-back direction so that their center lines are aligned. The peripheral edge of the foremost projector lens 19a is fixed to the front end of the lens holder 7 with the annular cap 8. The other projector lenses 19b to 19d are positioned in the direction along the center line of the lens holder 7 with a step height on the inner periphery of the lens holder 7, a fitting ring and the like, and are fixed on the inner periphery of the lens holder 7.

A phosphor panel 20 has a rectangular flat-plate shape, and the peripheral edge of the phosphor panel 20 is attached to a rectangular aperture at the center of the laser holder 9 so that the center line of the phosphor panel 20 is aligned with the center line of the front assembly 2. This phosphor panel 20 includes a pair of transparent plates, and a light transmission unit defined between the pair of transparent plates to store a granular phosphor material. The phosphor panel 20 has a light-incident face that is formed at the transparent plate on the rear side and facing the rear assembly 3. The phosphor panel 20 has a light-emission face that is formed at the transparent plate on the front side and facing the rear face of the projector lens 19d.

In the first irradiation system 13a, light emitted from the laser-light emission device 14a (e.g., blue light) is incident on the light deflector 15a via an optical path 22a (FIG. 2). The light deflector 15a reflects the incident light. The reflected light is incident on the light-incident face as the rear face of the phosphor panel 20 via an optical path 23a, and is emitted toward the projector lens 19d from the light-emission face as the front face of the phosphor panel 20.

In the second irradiation system 13b, light emitted from the laser-light emission device 14b (the light has the same color as that of the light emitted from the laser-light emission device 14a) is incident on the light deflector 15b via an optical path 22b (FIG. 2). The light deflector 15b reflects the incident light. The reflected light is incident on the light-incident face as the rear face of the phosphor panel 20 via an optical path 23b, and is emitted toward the projector lens 19d from the light-emission face as the front face of the phosphor panel 20.

The projector lenses 19a to 19d and the phosphor panel 20 make up an element common to the two irradiation systems 13a and 13b. The reflected light from the light deflectors 15a and 15b passes through the phosphor panel 20. At this time, the color of the light is changed from blue to white, for example, by the fluorescent material in the phosphor panel 20. The light emitted from the phosphor panel 20 passes through the projector lenses 19a to 19d in their arranged order from the rear to the front, and is emitted to the front of the vehicle from the front face of the projector lens 19a.

In the following, the two irradiation systems 13a and 13b are collectively called "irradiation systems 13" when there is no need to make a distinction. Similarly, the laser-light emission devices 14a, 14b, the light deflectors 15a, 15b, the condenser lenses 16a, 16b, the optical paths 22a, 22b and the optical paths 23a, 23b are collectively called "laser-light emission devices 14", "light deflectors 15", "condenser lenses 16", "optical paths 22" and "optical paths 23", respectively, when there is no need to make a distinction.

The center line of the optical path 22 is the optical axis of the light emitted from the laser-light emission device 14. The center line of the optical path 23 is the optical axis of the light emitted from the light deflector 15 and of the light incident on the phosphor panel 20. For the terms of emitted light and incident light, the same light may be emitted light viewed from the element that emits the light, and may be incident light viewed from the element on which the light is incident. For example, light along the optical path 22 is emitted light viewed from the laser-light emission device 14, and is incident light viewed from the light deflector 15.

FIG. 3 is a perspective view of the light deflector 15 viewed from diagonally forward. The light deflector 15 as a MEMS device includes a mirror unit 32, an inner rectangular frame 33, and an outer rectangular frame 34. The mirror unit 32 is disposed turnably at the center of the light deflector. The inner rectangular frame 33 externally surrounds the mirror unit 32. The outer rectangular frame 34 externally surrounds the inner rectangular frame 33. The light deflector 15 is configured to reflect incident light from the laser-light emission device 14 via the optical path 22 at a mirror face 32a of the mirror unit 32 and emit the light reflected from the mirror face 32a toward the phosphor panel 20 via the optical path 23.

For the purpose of illustration, lateral direction X, longitudinal direction Y and thickness direction Z that are orthogonal to each other are defined for the light deflector 15. Lateral direction X and longitudinal direction Y are directions parallel to the long sides and the short sides of the outer rectangular frame 34, respectively. Thickness direction Z is a direction along the thickness of the outer rectangular frame 34. Since the light deflector 15 is manufactured by a MEMS technique, it has a laminated structure. Thickness direction Z of the light deflector 15 is the same as the lamination direction of the laminated structure of the light deflector 15.

The light deflector 15 has a front face in thickness direction Z, at which light from the laser-light emission device 14 is incident on the light deflector 15 (this is also the face where light reflected from the light deflector 15 is emitted). The light deflector 15 has a rear face that is on the opposite side of the front face in thickness direction Z. Positive directions of lateral direction X and longitudinal direction Y are to the right and to the above of the light deflector 15 in the front view. Positive direction of thickness direction Z is directed from the rear face to the front face of the light deflector 15.

A pair of torsion bars (elastic beams) 35*a*, 35*b* are disposed on one side (above in the front view of the light deflector 15) and on the other side (below in the front view of the light deflector 15) of the mirror unit 32 in longitudinal direction Y so as to couple the mirror unit 32 and the inner rectangular frame 33.

Inner actuators 36*a* and 36*b* are disposed on one side of the mirror unit 32 in longitudinal direction Y, and are disposed on one side (to the left in the front view of the light deflector 15) and on the other side (to the right in the front view of the light deflector 15), respectively, of the torsion bar 35*a* in lateral direction X. Inner actuators 36*c* and 36*d* are disposed on the other side of the mirror unit 32 in longitudinal direction Y, and are disposed on the one side and on the other side, respectively, of the torsion bar 35*b* in lateral direction X.

In the following, the torsion bars 35*a*, 35*b* and the inner actuators 36*a* to 36*d* are collectively called "torsion bars 35" and "inner actuators 36", respectively, when there is no need to make a distinction. The inner actuators 36 extend in lateral direction X to couple the torsion bars 35 and the inner rectangular frame 33. Each inner actuator 36 is a piezoelectric type actuator that is made up as a unimorph cantilever. A piezoelectric actuator has a piezoelectric membrane in its laminated structure that deforms with voltage applied. Thereby both ends of a cantilever as a supporting unit to which the piezoelectric film is fixed are displaced relatively, whereby the actuator displaces a target due to the relative displacement of the both ends of the cantilever.

Outer actuators 37*a*, 37*b* are disposed on one side and on the other side of the inner rectangular frame 33 in lateral direction X, and intervene between the inner rectangular frame 33 and the outer rectangular frame 34 to couple the inner rectangular frame 33 and the outer rectangular frame 34. Each outer actuator 37*a*, 37*b* also is a piezoelectric type actuator that is made up as a unimorph cantilever. The outer actuators 37*a*, 37*b* are collectively called "outer actuators 37" when there is no need to make a distinction. Each outer actuator 37 includes a plurality of unimorph piezoelectric cantilevers that are serially coupled along a meander line (accordion-shaped line).

A plurality of electrode pads 38*a*, 38*b* are formed on the surface of the outer rectangular frame 34 along the short sides thereof on one side and on the other side, respectively, in lateral direction X. These electrode pads are connected to electrodes of electric structures of the inner actuators 36 or the like through wiring (not illustrated) formed along the surface of the light deflector 15 or a wiring layer (not illustrated, typically grounding wiring) embedded in the light deflector 15. In the following, the electrode pads 38*a*, 38*b* are collectively called "electrode pads 38" when there is no need to make a distinction.

Incident light on the mirror face 32*a* of the mirror unit 32 in the light deflector 15 from the laser-light emission device 14 is incident on the mirror unit 32 via the optical path 22 that is fixed irrespective of the turning angle of the mirror unit 32. When the inner actuators 36 act, the mirror unit 32 can reciprocally turn about a first rotation axis as the axis line of the torsion bar 35. When the outer actuators 37 act, the mirror unit 32 can reciprocally turn about a second rotation axis that is orthogonal to the first rotation axis and is parallel to the mirror face 32*a* of the mirror unit 32. When the mirror unit 32 is directed to the front, the first and second rotation axes are substantially parallel to longitudinal direction Y and lateral direction X, respectively, and the line normal to the mirror face 32*a* is parallel to thickness direction Z.

For example, the reciprocal turning of the mirror unit 32 about the first rotation axis has a frequency of 15 kHz, and the reciprocal turning of the mirror unit 32 about the second rotation axis has a frequency of 60 Hz that is lower than 15 kHz. The reciprocal turning of the mirror unit 32 about the first rotation axis is the reciprocal turning at a high frequency, for which the natural oscillation of the mirror unit 32 (resonance) is used. That is, the driving frequency of the mirror unit 32 about the first rotation axis by the inner actuators 36 is equal to the resonant frequency of the natural oscillation of the mirror unit 32, whereby the mirror unit 32 driven by the inner actuator 36 resonates and stably oscillates reciprocally.

On the contrary, the reciprocal turning of the mirror unit 32 about the second rotation axis is the reciprocal turning at a low frequency, for which the natural oscillation of the mirror unit 32 is not used. That is, the mirror unit 32 reciprocally turns about the second rotation axis with non-resonance at a non-resonant frequency different from the resonant frequency. The resonant frequency of the mirror unit 32 depends on the dimensions, the weight, the material and the like of the mirror unit 32 and the torsion bars 35.

Light incident on the light-incident face of the phosphor panel 20 from the light deflector 15 scans in the direction of horizontal axis H (FIG. 6) (horizontal direction) and in the direction of vertical axis V (FIG. 6) (vertical direction) on the light-incident face. The scanning directions on the light-incident face of the phosphor panel 20 corresponding to the reciprocal turning about the rotation axes at the light deflector 15*a* and the scanning directions on the light-incident face of the phosphor panel 20 corresponding to the reciprocal turning about the first and second rotation axes at the light deflector 15*b* have a reversed relationship.

Specifically, the scanning directions on the light-incident face of the phosphor panel 20 corresponding to the reciprocal turning about the first and second rotation axes at the light deflector 15*a* are in the direction of horizontal axis H and vertical axis V, respectively. On the contrary, the scanning directions on the light-incident face of the phosphor panel 20 corresponding to the reciprocal turning about the first and second rotation axes at the light deflector 15*b* are in the direction of vertical axis V and horizontal axis H, respectively. A specific configuration to define these scanning directions on the light-incident face of the phosphor panel 20 is described later with reference to FIG. 6.

Figure 4A:
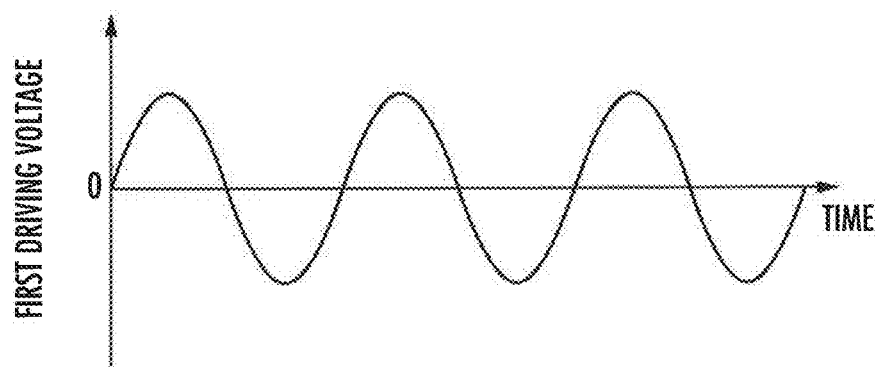
FIG. 4A is a waveform chart of the driving voltage of inner actuators that is a first driving voltage.
Figure 4B:
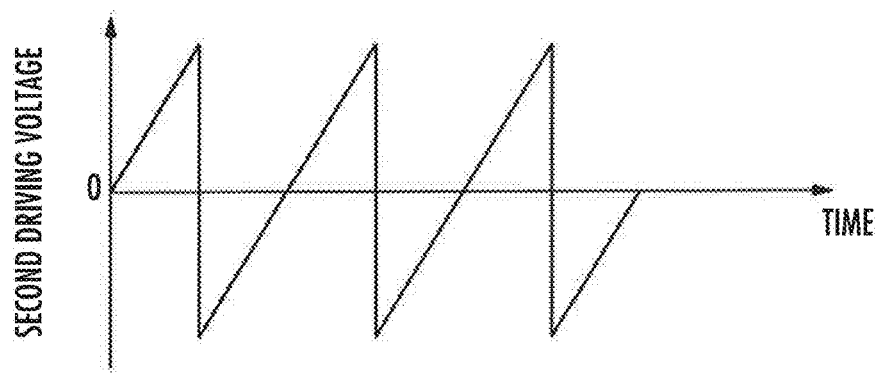
FIG. 4B is a waveform chart of the driving voltage of outer actuators that is a second driving voltage not including offset voltage.
Figure 4C:
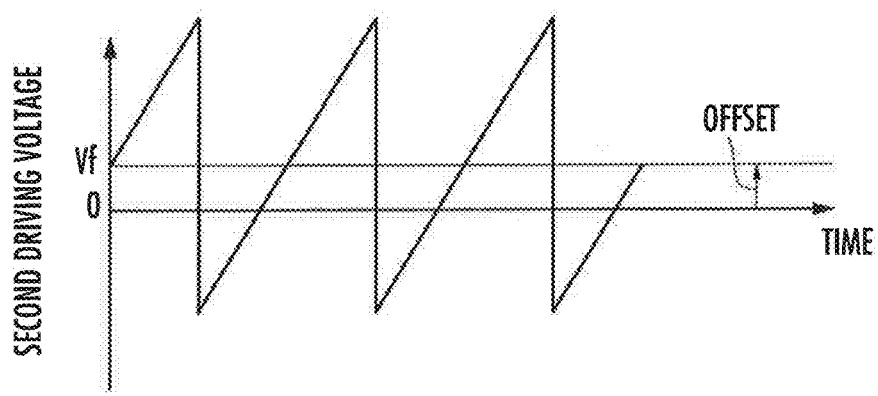
FIG. 4C is a waveform chart of the driving voltage of outer actuators that is a second driving voltage including offset voltage.

FIGS. 4A to 4C explain the driving voltage of each actuator of the light deflector 15. First driving voltage in FIG. 4A means the driving voltage of the inner actuators 36. Second driving voltage in FIGS. 4B and 4C means the driving voltage of the outer actuators 37. FIG. 4B shows the second driving voltage that does not include offset voltage, and FIG. 4C shows the second driving voltage that includes offset voltage.

The value of the offset voltage is adjustable in the range of −Vf to +Vf (Vf denotes a predetermined positive value). In FIG. 4C, the offset voltage as the amount of offset is adjusted at Vf. The second driving voltage in FIG. 4C is superimposed voltage obtained by superimposing the basic driving voltage in FIG. 4B and the offset voltage.

Since the reciprocal turning of the mirror unit 32 about the first rotation axis by the inner actuators 36 uses the natural oscillation of the mirror unit 32, the first driving voltage is limited to sinusoidal voltage. On the contrary, since the reciprocal turning of the mirror unit 32 about the second rotation axis by the outer actuators 37 does not use the natural oscillation of the mirror unit 32, the second driving voltage is not limited to sinusoidal voltage. Voltage of any waveform can be used as the basic driving voltage of the second driving voltage as long as it is voltage of a waveform along which the voltage value increases and decreases. The basic driving voltage in FIG. 4B has a sawtooth waveform.

In the headlight unit 1, the outer actuators 37 of the light deflector 15*a* in the irradiation system 13*a* receive the second driving voltage that includes the basic driving voltage only and does not include offset voltage as shown in FIG. 4B. On the contrary, the outer actuators 37 of the light deflector 15*b* in the irradiation system 13*b* receive the second driving voltage as the superimposed voltage obtained by superimposing the basic driving voltage and offset voltage as shown in FIG. 4C.

Figure 5:
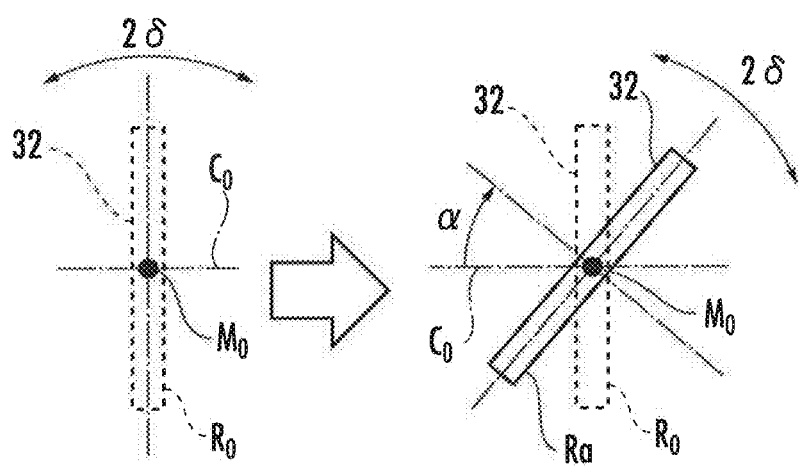
FIG. 5 explains the center turning angle of the mirror unit about the second rotation axis when the second driving voltage includes the offset voltage.

FIG. 5 explains the center turning angle of the mirror unit 32 about the second rotation axis when the second driving voltage includes the offset voltage (second driving voltage=basic driving voltage+offset voltage). The center turning angle of the mirror unit 32 about the second rotation axis is defined as the turning angle at the center in the turning angle range when the mirror unit 32 reciprocally turns about the second rotation axis. Note here that, although the mirror unit 32 has a center turning angle of the mirror unit 32 about the first rotation axis as well, the reciprocal turning of the mirror unit 32 about the first rotation axis has no relation to the offset of the second driving voltage. Hereinafter the center turning angle of the mirror unit 32 refers to the center turning angle in the reciprocal turning range of the mirror unit 32 about the second rotation axis.

For the center turning angle of the mirror unit 32, a "reference center turning angle" is defined as follows. The reference center turning angle is the center turning angle when the mirror unit 32 is directed to the front of the headlight unit 1 (when the line normal to the mirror face 32*a* is parallel to thickness direction Z). The mirror unit 32 reciprocally turns about the second rotation axis by ±δ for various center turning angles. δ corresponds to the amplitude relative to the center level of the second driving voltage.

For the purpose of illustration, when the mirror unit 32 is at the reference center turning angle, the turning angle of the mirror unit 32 is defined as 0°. When the center turning angle of the mirror unit 32 equals 0°, the turning angle range of the mirror unit 32 about the second rotation axis is in the range of −δ to +δ about the turning angle=0°. The amount of turning angle is 2δ.

In FIG. 5, Mo denotes the center of the mirror unit 32. Co denotes the center line of the mirror unit 32 when the mirror unit 32 is at the reference center turning angle. Ro denotes the turning position of the mirror unit 32 when the turning angle of the mirror unit 32 equals 0°. Ra denotes the turning position of the mirror unit 32 when the turning angle of the mirror unit 32 equals α. α corresponds to Vf as stated above. When the center turning angle of the mirror unit 32 is set at α, the mirror unit 32 has the turning angle range about the second rotation axis that is from α−δ to α+δ about the turning angle=α. The amount of turning angle is 2δ.

Figure 6:
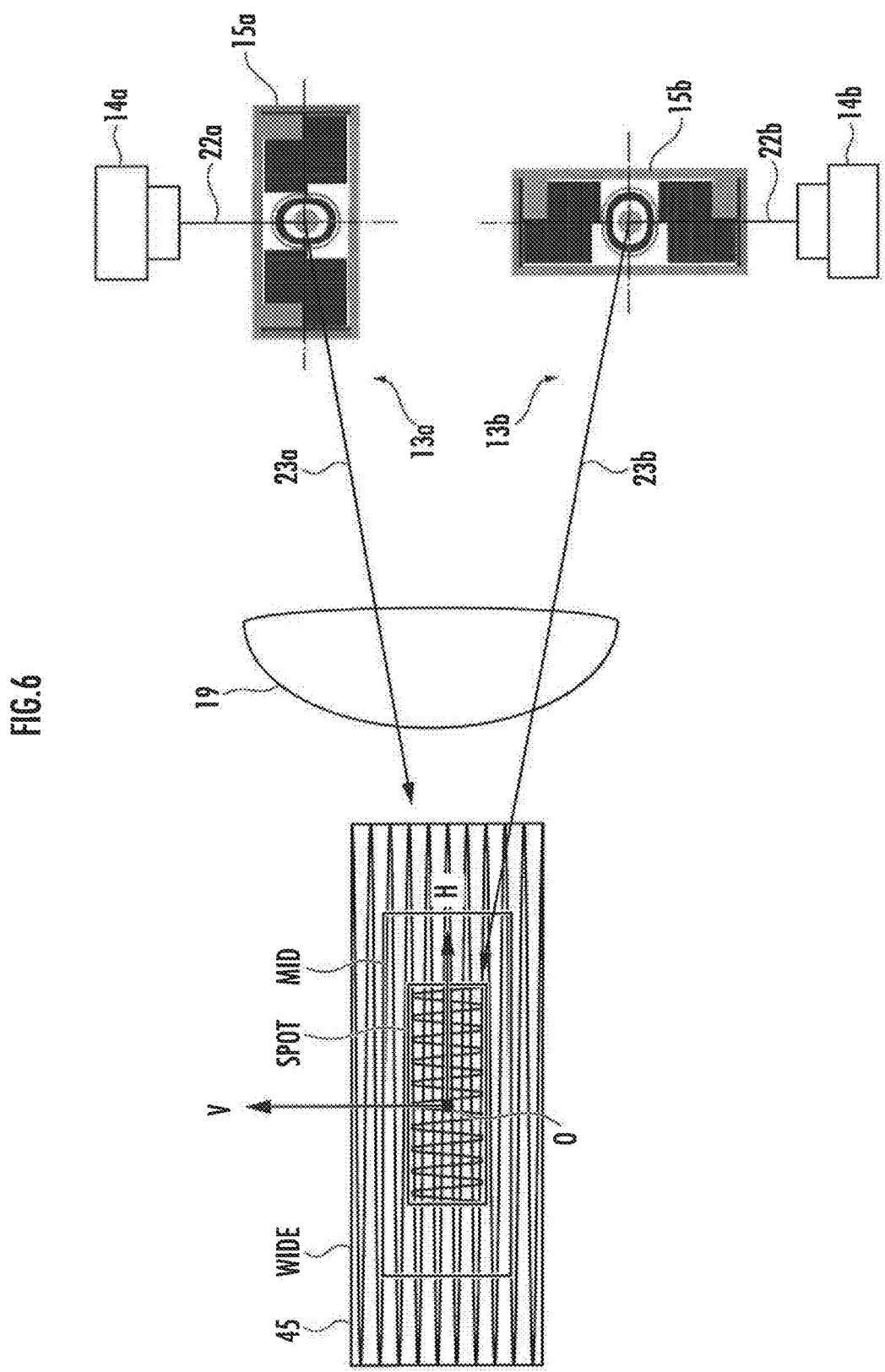
FIG. 6 explains the rotation positions of two light deflectors.

FIG. 6 explains the rotation positions of the two light deflectors 15. Reference numeral 45 denotes a virtual perpendicular screen that stands perpendicularly at a front position of the projector lenses 19 at a predetermined distance. The virtual perpendicular screen 45 has vertical axis V and horizontal axis H that are set in the vertical direction and the horizontal direction of the virtual perpendicular screen 45, respectively. The dimensions of the virtual perpendicular screen 45 in vertical axis V direction and in horizontal axis H direction correspond to the dimensions of the maximum irradiation region WIDE of a plurality of irradiation regions generated on the virtual perpendicular screen 45 by the headlight units 1*a*, 1*b*, which will be described with reference to FIG. 10. The origin O of vertical axis V and horizontal axis H is set at the intersection of the diagonal lines of the virtual perpendicular screen 45.

The directions of the first and second rotation axes of the light deflector 15 relative to the optical axis of the optical path 22 (e.g., the rotation angles of the first and second rotation axes about the optical axis of the optical path 22 when the mirror unit 32 stops the turning) are changed, whereby the scanning directions of the reflected light from the mirror unit 32 corresponding to the reciprocal turning about the first and second rotation axes of the light deflector 15 to scan the irradiation region are changed.

For the light deflector 15*a*, the directions of the first and second rotation axes relative to the optical axis of the optical path 22*a* are set so that the scanning directions resulting from the reciprocal turning of the mirror unit 32 about the first and second rotation axes are in the directions of horizontal axis H and of vertical axis V, respectively, of the virtual perpendicular screen 45. For the light deflector 15*b*, the directions of the first and second rotation axes relative to the optical axis of the optical path 22*b* are set so that the scanning directions resulting from the reciprocal turning of the mirror unit 32 about the first and second rotation axes are in the directions of vertical axis V and of horizontal axis H, respectively, of the virtual perpendicular screen 45.

Note here that the directions of the first and second rotation axes of the mirror unit 32 relative to the optical axis of the optical path 22 are set in lateral direction X and longitudinal direction Y of the light deflector 15 relative to the optical axis of the optical path 22. In FIGS. 1 and 6, the light deflectors 15*a* and 15*b* are placed laterally and longitudinally, respectively.

Three irradiation regions are generated on the virtual perpendicular screen 45, including SPOT, MID (middle) and WIDE (wide area) irradiation regions. As stated above, a vehicle has one headlight on the left and the right, each headlight includes two headlight units 1 in this example. Therefore each headlight has four irradiation systems in total, and so generates up to four irradiation regions, so that the vehicle as a whole can generate up to eight irradiation regions. Although only three irradiation regions in total are drawn on the virtual perpendicular screen 45, this is because MID is a common irradiation region to the two headlight units 1. That is, the irradiation systems 13*a* and 13*b* in one of the headlight units 1 of each headlight generate MID and SPOT, respectively, and the irradiation systems 13*a* and 13*b* in the other headlight unit 1 generate MID and WIDE, respectively.

Since MID is a common irradiation region to the two headlight units 1, this region is brighter. Since SPOT is an irradiation region that is generated by overlapping it on such a common irradiation region, this region is brighter than MID.

Figure 7A:
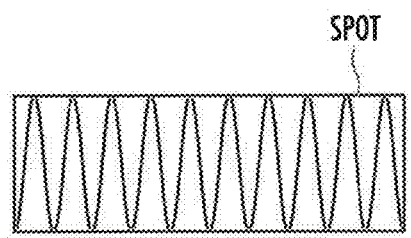
FIG. 7A shows the trace of scanning light in SPOT irradiation region.
Figure 7B:
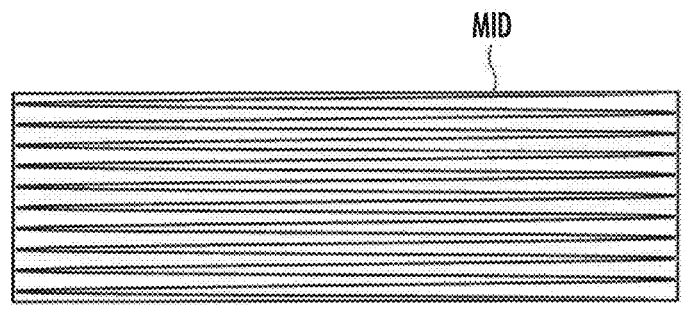
FIG. 7B shows the trace of scanning light in MID irradiation region.
Figure 7C:
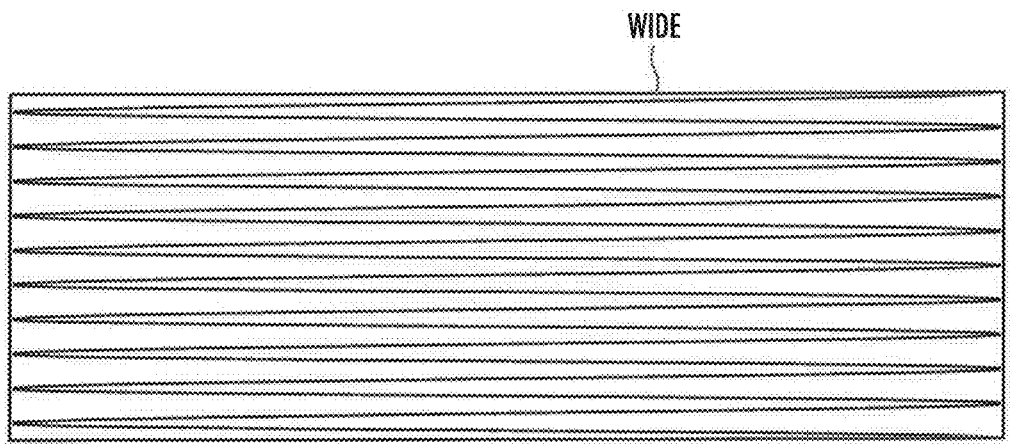
FIG. 7C shows the trace of scanning light in WIDE irradiation region.
Figure 8A:
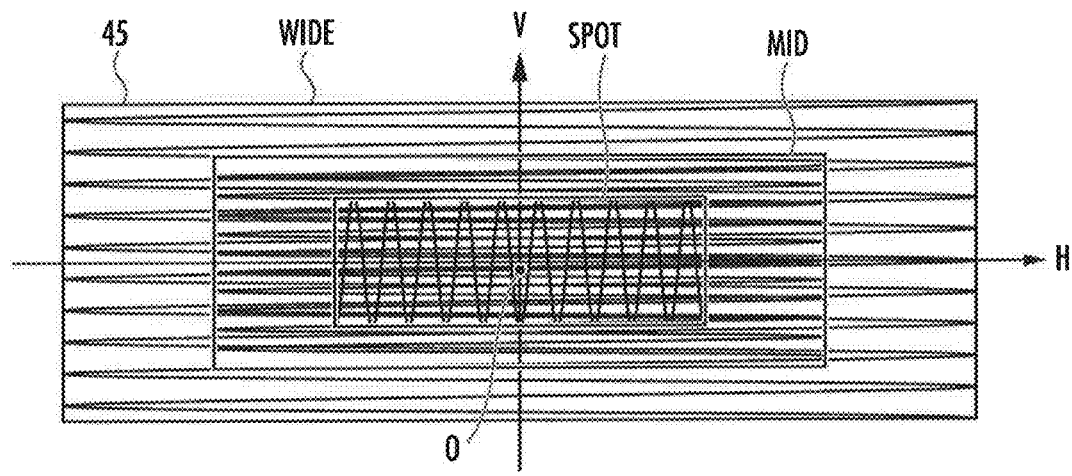
FIG. 8A and FIG. 8B show three irradiation regions of FIG. 7A to FIG. 7C overlapped on a virtual perpendicular screen.
Figure 8B:
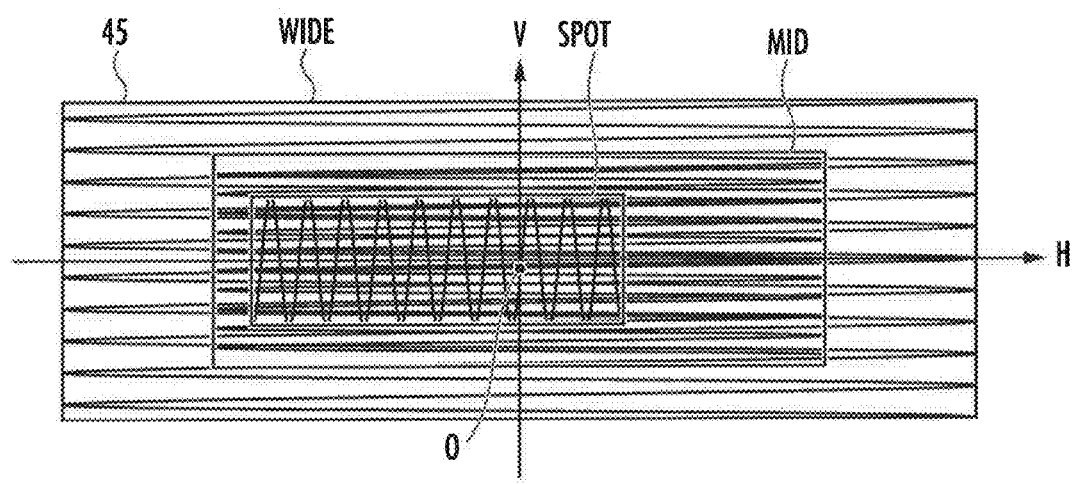

FIGS. 7A to 7C show the trace (light trace) of scanning light in SPOT, MID, and WIDE, respectively. FIG. 8 shows the three irradiation regions of FIGS. 7A to 7C overlapped on the virtual perpendicular screen 45. In FIG. 8A, the center of SPOT coincides with the centers of MID and WIDE. On the contrary, in FIG. 8B, the center of SPOT is shifted from the centers of MID and WIDE in the direction of horizontal axis H.

SPOT is the irradiation region, in which the reciprocal turning of the mirror unit 32 about the first and second rotation axes correspond to the directions of vertical axis V (vertical direction) and of horizontal axis H (horizontal direction), respectively, and the resultant scanning light scans. Therefore the trace of the scanning light in SPOT has a pattern of reciprocating between both ends in the direction of vertical axis V many times. On the contrary, MID and WIDE are the irradiation regions, in which the reciprocal turnings of the mirror unit 32 about the first and second rotation axes correspond to the directions of horizontal axis H and of vertical axis V, respectively, and the resultant scanning light scans. Therefore the trace of the scanning light in MID and WIDE has a pattern of reciprocating between both ends in the direction of horizontal axis H many times.

FIG. 9 shows other examples of the waveform of the second driving voltage, and shows a comparison between with offset and without offset. FIG. 9A shows the second driving voltage that is sinusoidal wave. FIG. 9B shows the second driving voltage that is triangular wave. The second driving voltage may be any of AC and DC as long as it has a constant waveform that repeats monotonic increase and monotonic decrease alternately.

Figure 10:
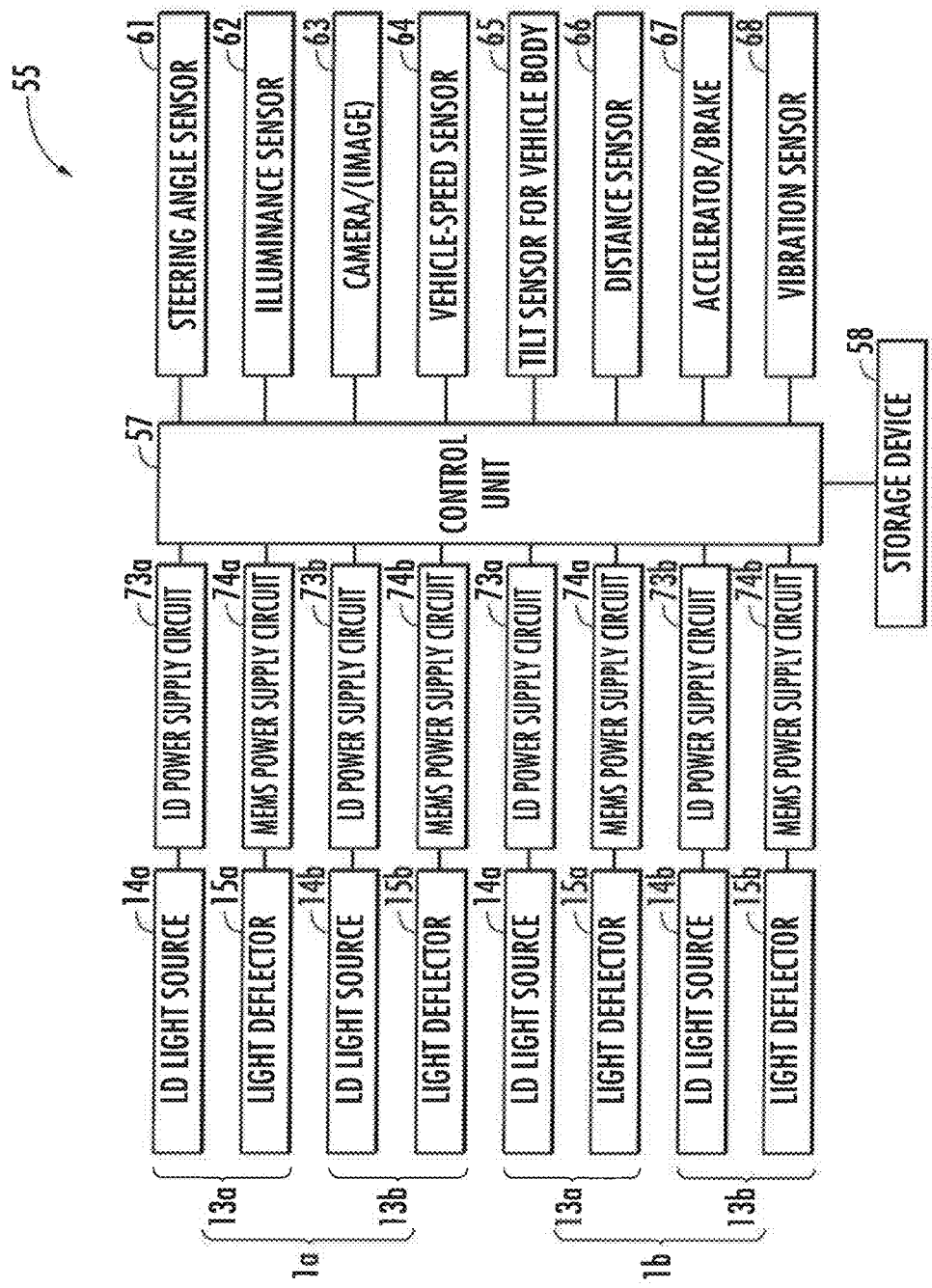
FIG. 10 is a block diagram of a headlight device to be mounted on a host vehicle.

FIG. 10 is a block diagram of a headlight device 55 to be mounted on a host vehicle 79 (FIG. 11A and FIG. 11B). The host vehicle 79 is configured to control any one of the left and right headlights. Although not shown in FIG. 10, a control unit 57 and the elements shown on the right of the control unit 57 of the elements of the headlight device 55 control the other headlight as well.

The elements other than the headlight units 1a, 1b of the elements of the headlight device 55 are used not only for the headlight device 55 but also for controlling of collision avoidance and drive assist of the host vehicle 79, for example.

One headlight device 55 has two headlight units 1a and 1b. The headlight units 1a and 1b are collectively called "headlight units 1" when there is no need to make a distinction.

The control unit 57 is made up of a microprocessor including an operation unit (CPU), a temporary storage unit (RAM) and an input/output unit (I/O). A storage device 58 includes a volatile memory as well as a ROM and a readable and writable non-volatile memory, and so can store a program to be executed by the control unit 57 as well as data that has to be stored also when no electricity is supplied to the storage device 58.

A steering angle sensor 61 detects a steering angle of the steering wheel of the host vehicle 79 (turning direction and turning amount). An illuminance sensor 62 detects the illuminance around the host vehicle 79 (whether it is day or night). A camera 63 generates a captured image in front of the host vehicle 79. Whether any preceding vehicle 78 (FIG. 11A and FIG. 11B) is present or not can be detected based on the well-known processing of the captured image. A vehicle-speed sensor 64 detects the vehicle speed of the host vehicle 79. A tilt sensor 65 of the vehicle body detects the inclination angle of the road based on the tilt of the vehicle body. A distance sensor 66 detects the distance to the preceding vehicle 78. An accelerator/brake 67 detects whether the driver manipulates the accelerator and the brake or not. A vibration sensor 68 detects the vibration of the host vehicle 79.

In the following description, the elements in the irradiation systems 13a and 13b are referred to with indexes "a" and "b" when there is need to make a distinction, or are referred to without indexes "a" and "b" when there is no need to make a distinction.

Each irradiation system 13 has a LD (Laser Diode) power supply circuit 73 and a MEMS power supply circuit 74. The LD power supply circuit 73 controls ON and OFF of the laser-light emission device 14 emitting blue light, for example, in accordance with a control signal from the control unit 57. The MEMS power supply circuit 74 controls the first and second driving voltages of the light deflector 15 in accordance with a control signal from the control unit 57. The control unit 57 generates a control signal to be output to the LD power supply circuit 73 and the MEMS power supply circuit 74 based on the detection signals from the steering angle sensor 61 to the vibration sensor 68.

FIG. 11A and FIG. 11B show the SPOT irradiation regions, and show a comparison between the host vehicle 79 without and with the headlight device of FIG. 10. In FIGS. 11A and 11B, the host vehicle 79 travels along a lane 82 as a curved road 81, assuming that a preceding vehicle 78 is present in front of the host vehicle 79. FIG. 11A and FIG. 11B show the states of SPOT when the host vehicle 79 operates with the headlight device 55 not including offset and including offset, or on and off offset, respectively.

When the host vehicle 79 does not include the headlight device 55 (FIG. 11A), the horizontal center line of SPOT is fixed on the horizontal center line of the host vehicle 79. Therefore also when the host vehicle 79 travels along the curved road 81, the horizontal center line of SPOT is located on the horizontal center line of the host vehicle 79 similarly to the traveling along a straight road. As a result, the preceding vehicle 78 is outside of SPOT.

On the contrary, when the host vehicle 79 includes the headlight device 55 (FIG. 11B), the headlight device 55 controls offset of the second driving voltage of the light deflector 15b in the irradiation system 13b of the headlight unit 1a based on the detection signals from the steering angle sensor 61 to the vibration sensor 68 and in accordance with the curvature of the curved road 81 and the position of the preceding vehicle 78. Thereby, the preceding vehicle 78 is kept in SPOT, and so the driver of the host vehicle 79 can understand the traveling state of the preceding vehicle 78 clearly.

Specifically the control unit 57 controls SPOT as follows. Specifically, when the traveling lane 82 shifts from a straight part to a curved part, such shifting can be detected as follows. The driver of the host vehicle 79 manipulates the steering wheel so as to correspond to the curve of the traveling lane 82 on the curved road 81. Thereby, the steering angle detected by the steering angle sensor 61 is changed, so that the turning direction of the host vehicle 79 is detected. The control unit 57 can detect the horizontal displacement of the preceding vehicle 78 relative to the horizontal center line of the host vehicle 79 through the well-known processing of the image captured by the camera 63. In this way, the control unit 57 directs SPOT in the turning direction detected by the steering angle sensor 61 and toward the preceding vehicle 78 displaced horizontally.

Further, the control unit 57 can predict the displacement of the preceding vehicle 78 along the curved road 81, and can direct SPOT in the predicted direction in advance. For instance, the detection signals from the vehicle-speed sensor 64 and the distance sensor 66 enable detections of the direction of the preceding vehicle 78 relative to the host vehicle 79 and an increase and decrease in relative distance between the host vehicle 79 and the preceding vehicle 78. Based on such detections, the control unit 57 controls the horizontal position of SPOT so that the preceding vehicle 78 can be within SPOT.

Figure 12A:
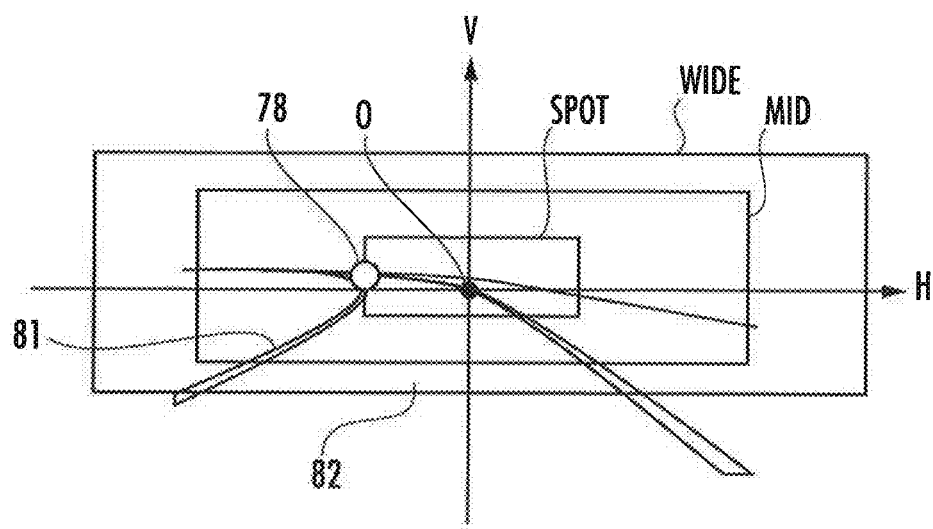
FIG. 12A shows SPOT irradiation region in FIG. 11A on the virtual perpendicular screen.
Figure 12B:
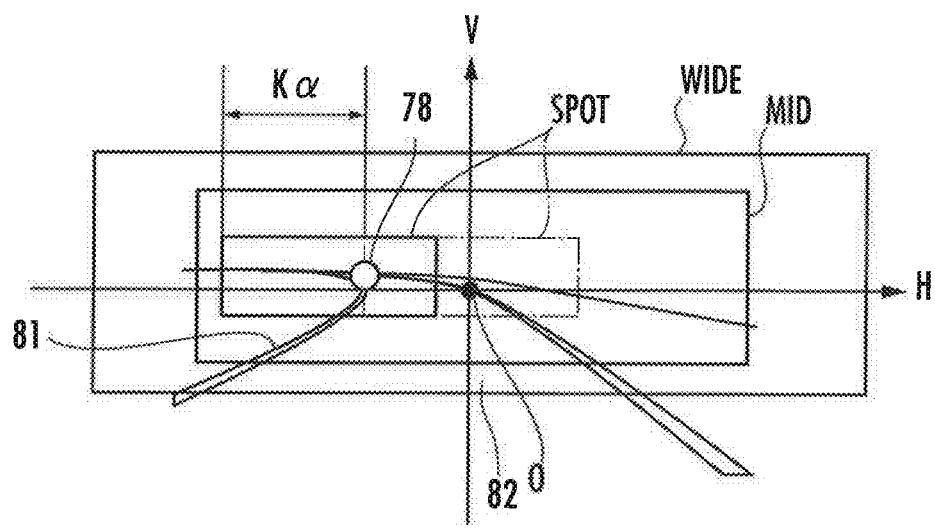
FIG. 12B shows SPOT irradiation region in FIG. 11B on the virtual perpendicular screen.

FIGS. 12A and 12B show the displacement of SPOT on the virtual perpendicular screen 45. For easy understanding of the displacement of SPOT, FIGS. 12A and 12B show the traveling lane 82 or the like as the background of the virtual perpendicular screen 45. FIGS. 12A and 12B show the positions of SPOT corresponding to FIGS. 11A and 11B, respectively. The origin O at the intersection of horizontal axis H and vertical axis V is present on the horizontal center line of the host vehicle 79.

As the host vehicle 79 shifts from the straight part to the curved road 81, the preceding vehicle 78 is displaced to the turning direction in the direction of horizontal axis H on the virtual perpendicular screen 45, and finally reaches the end of SPOT in the direction of horizontal axis H. FIG. 12A shows the state where, if this state is left as it is, the preceding vehicle 78 will be outside of SPOT.

When the host vehicle 79 does not include the headlight device 55, SPOT cannot be displaced in the direction of horizontal axis H. Therefore the preceding vehicle 78 will be outside of SPOT finally (FIG. 12A).

On the contrary, when the host vehicle 79 include the headlight device 55, traveling of the host vehicle 79 along the curved road 81 and traveling of the preceding vehicle 78 along the traveling lane 82 can be detected from the steering angle detected by the steering angle sensor 61 and the image captured by the camera 63 and the like. Thereby, SPOT is shifted toward the displacement of the preceding vehicle 78 in the direction of horizontal axis H (inward of the curved road 81), so that the preceding vehicle 78 can be kept in SPOT.

There is no need to displace SPOT in the direction of horizontal axis H so that the preceding vehicle 78 is kept at the horizontal center of SPOT. This can be displaced so that the preceding vehicle 78 is within SPOT. In this embodiment, offset voltage included in the second driving voltage is switched with three stages of 0, +Vf, and −Vf so as to switch the relative position of SPOT in the direction of horizontal axis H with three stages of center, left and right in a stepwise manner. Instead of such switching of the offset voltage in a stepwise manner, the offset voltage may be changed continuously so that the relative position of SPOT in the direction of horizontal axis H can be changed steplessly.

FIG. 12B shows the state where SPOT has been switched on the virtual perpendicular screen from the position at the horizontal center corresponding to offset voltage=0 (alternate long and short dash line) to the position to the left after shifting by the length Kα corresponding to the offset voltage=−Vf (solid line), while keeping SPOT within MID.

That is the descriptions of the illustrated embodiment of the present invention, and the present invention is not limited to such an embodiment, and can include various modifications without departing from the spirit of the present invention (technical idea of the present invention).

For instance, the embodiment includes, as a light source, the laser-light emission device 14 emitting blue laser light. The present invention may include, as a light source, a RGB laser, a LED (Light Emitting Diode), or the like.

The embodiment includes the control unit 57 that doubles as a resonant control unit and a non-resonant control unit. The resonant control unit and the non-resonant control unit may be separate control units.

In the embodiment, the situation of the vehicle driving is detected by the steering angle sensor 61 to the vibration sensor 68 as a situation detection unit, and the control unit 57 determines offset voltage based on the detected situation. In the present invention, the situation of the vehicle driving may be detected by another element other than the steering angle sensor 61 to the vibration sensor 68 or by omitting a specific sensor from the steering angle sensor 61 through the vibration sensor 68.

In the embodiment, the irradiation system 13a and 13b as the first and second irradiation systems are disposed up and down in their positional relationship. The first and second irradiation systems of the present invention may be disposed horizontally or diagonally in their positional relationship.

The embodiment includes, as a projector unit, a plurality of transparent projector lenses 19. The projector unit of the present invention may include one projector lens, or a colored and not colorless transparent lens.

In the embodiment, the first frequency is 15 kHz and the second frequency is 60 Hz. The first and second frequencies used in the present invention are not limited to them, and other values may be used.

In the embodiment, the light deflector 15 to deflect incident light from the laser-light emission device 14 includes the inner actuators 36 as a first actuator and the outer actuators 37 as a second actuator. Then, both of the inner actuators 36 and the outer actuators 37 are piezoelectric actuators each including a piezoelectric membrane that deforms with voltage applied.

The actuators of the light deflectors of the present invention are not limited to piezoelectric actuators, as long as it allows the mirror unit to reciprocally turn about a first rotation axis at the frequency of the natural oscillation (resonant frequency) and to reciprocally turn about a second rotation axis at a frequency different from the frequency of the natural oscillation (non-resonant frequency), where the first and the second rotation axes being orthogonal to each other. The actuators may be of an electromagnetic type, an electrostatic type or other types.

The headlight device 55 in the embodiment includes the phosphor panel 20. The phosphor panel 20 is for irradiation of the irradiation region with white scanning light (irradiation light). When a light source generating white light is included or when the colors of scanning light is not limited, the phosphor panel 20 can be omitted. When the light source is a laser light source as in the laser-light emission device 14, a diffuser plate may be disposed at some part of the optical path in addition to the phosphor panel 20 or instead of the phosphor panel 20.

In the embodiment, SPOT makes up a first irradiation region, MID makes up a second irradiation region, and WIDE makes up a third irradiation region. Then, only in the irradiation region of SPOT, the vertical scanning and the horizontal scanning correspond to resonant oscillation (natural oscillation) and non-resonant oscillation (non-natural oscillation), respectively.

Alternatively, the vertical scanning and the horizontal scanning in MID also may correspond to resonant oscillation and non-resonant oscillation, respectively. Note here that, when a plurality of irradiation regions are set in sequence from an inner irradiation region to an outer irradiation region and each irradiation region is set inside of one outside irradiation region, then the vertical scanning and the horizontal scanning in the outermost irradiation region preferably correspond to non-resonant oscillation and resonant oscillation, respectively.

What is claimed is:

1. A headlight device, comprising a light source, a light deflector, and a control unit, wherein
   the light deflector includes:
   a mirror unit configured to reflect light from the light source in a direction corresponding to a turning angle of the mirror unit about a first rotation axis and a second rotation axis, the first rotation axis and the second rotation axis being orthogonal to each other;
a first actuator configured to reciprocally turn the mirror unit about the first rotation axis in accordance with a first driving voltage; and
a second actuator configured to reciprocally turn the mirror unit about the second rotation axis in accordance with a second driving voltage, and
the control unit includes:
a resonant control unit configured to generate the first driving voltage based on sinusoidal voltage at a first frequency that is a resonant frequency of natural oscillation of the mirror unit about the first rotation axis, and outputs the first driving voltage to the first actuator;
a non-resonant control unit configured to generate the second driving voltage based on superimposed voltage obtained by superimposing offset voltage with basic driving voltage having an increasing and decreasing waveform at a second frequency, the second frequency being a non-resonant frequency lower than the first frequency, and outputs the second driving voltage to the second actuator, and
directions of the first and second rotation axes of the light deflector relative to an optical axis of incident light to the mirror unit are set so that reflected light from the mirror unit due to reciprocal turning of the mirror unit about the first rotation axis is scanned vertically in an irradiation region in front and reflected light from the mirror unit due to reciprocal turning of the mirror unit about the second rotation axis is scanned horizontally in the irradiation region in front; and
a situation detection unit including at least one of a steering angle sensor, an illuminance sensor, a camera, a vehicle speed sensor, a tilt sensor, a distance sensor, an accelerator sensor, a brake sensor, and a vibration sensor, wherein the situation detection unit is configured to detect a situation based on output from at least one of the steering angle sensor, the illuminance sensor, the camera, the vehicle speed sensor, the tilt sensor, the distance sensor, the accelerator sensor, the brake sensor, and the vibration sensor on driving of a vehicle, wherein
the non-resonant control unit determines the offset voltage in accordance with situation detected by the situation detection unit.

2. The headlight device according to claim 1, wherein the second driving voltage is voltage having a sawtooth form.

3. A headlight device, comprising first and second irradiation systems, and a control unit configured to control the first and second irradiation systems, the irradiation systems individually including a light source and a light deflector configured to deflect light from the light source, and including a projector unit common to the irradiation systems to project light from the light deflectors to an irradiation region in front,
wherein
the light deflector of each irradiation system includes:
a mirror unit configured to reflect light from the light source in a direction corresponding to a turning angle of the mirror unit about a first rotation axis and a second rotation axis, the first rotation axis and the second rotation axis being orthogonal to each other;
a first actuator configured to reciprocally turn the mirror unit about the first rotation axis in accordance with a first driving voltage; and
a second actuator configured to reciprocally turn the mirror unit about the second rotation axis in accordance with a second driving voltage, and
the control unit includes, for the light deflectors of the irradiation systems:
a resonant control unit configured to generate the first driving voltage based on sinusoidal voltage at a first frequency that is a resonant frequency of natural oscillation of the mirror unit about the first rotation axis, and outputs the first driving voltage to the first actuator; and
a non-resonant control unit configured to generate the second driving voltage based on basic driving voltage having an increasing and decreasing waveform at a second frequency, the second frequency being a non-resonant frequency lower than the first frequency, and outputs the second driving voltage to the second actuator, and
in the first irradiation system,
directions of the first and second rotation axes of the light deflector relative to an optical axis of incident light to the mirror unit are set so that reflected light from the mirror unit due to reciprocal turning of the mirror unit about the first rotation axis is scanned horizontally in an irradiation region in front and reflected light from the mirror unit due to reciprocal turning of the mirror unit about the second rotation axis is scanned vertically in the irradiation region in front, and
in the second irradiation system,
directions of the first and second rotation axes of the light deflector relative to an optical axis of incident light to the mirror unit are set so that reflected light from the mirror unit due to reciprocal turning of the mirror unit about the first rotation axis is scanned vertically in an irradiation region in front and reflected light from the mirror unit due to reciprocal turning of the mirror unit about the second rotation axis is scanned horizontally in the irradiation region in front, and
the non-resonant control unit generates, for the second actuator of the second irradiation system, the second driving voltage based on superimposed voltage obtained by superimposing offset voltage with the basic driving voltage.

4. The headlight device according to claim 3, wherein
the irradiation region includes a first irradiation region and a second irradiation region, the first irradiation region being irradiated with light from the first irradiation system, and the second irradiation region being irradiated with light from the second irradiation system, and
the non-resonant control unit generates the second driving voltage so that the second irradiation region is displaced horizontally within the first irradiation region.

5. The headlight device according to claim 4, further comprising:
a situation detection unit including at least one of a steering angle sensor, an illuminance sensor, a camera, a vehicle speed sensor, a tilt sensor, a distance sensor, an accelerator sensor, a brake sensor, and a vibration sensor, wherein the situation detection unit is configured to detect situation based on output from at least one of the steering angle sensor, the illuminance sensor, the camera, the vehicle speed sensor, the tilt sensor, the distance sensor, the accelerator sensor, the brake sensor, and the vibration sensor on driving of a vehicle, wherein the non-resonant control unit determines the offset voltage in accordance with situation detected by the situation detection unit.

6. The headlight device according to claim 3, wherein the second driving voltage is voltage having a sawtooth form.

* * * * *